(12) United States Patent
Chaves

(10) Patent No.: US 12,272,947 B2
(45) Date of Patent: Apr. 8, 2025

(54) MODULAR GRAVITATIONAL ENERGY STORAGE SYSTEMS

(71) Applicant: Terrament, INC., Brooklyn, NY (US)

(72) Inventor: Eric Chaves, Brooklyn, NY (US)

(73) Assignee: Terrament, INC., Brooklyn, NY (US)

(*) Notice: Subject to any disclaimer, the term of this patent is extended or adjusted under 35 U.S.C. 154(b) by 0 days.

(21) Appl. No.: 18/385,670

(22) Filed: Oct. 31, 2023

(65) Prior Publication Data

US 2024/0079904 A1 Mar. 7, 2024

Related U.S. Application Data

(63) Continuation of application No. 17/237,048, filed on Apr. 22, 2021, now Pat. No. 11,855,457.

(60) Provisional application No. 63/013,820, filed on Apr. 22, 2020.

(51) Int. Cl.
*H02J 15/00* (2006.01)

(52) U.S. Cl.
CPC .................. *H02J 15/007* (2020.01)

(58) Field of Classification Search
CPC .................. H02J 15/007; H02J 15/00
See application file for complete search history.

(56) References Cited

U.S. PATENT DOCUMENTS

| | | | |
|---|---|---|---|
| 7,973,420 B2* | 7/2011 | Scott | F03G 3/00 290/55 |
| 2013/0043721 A1 | 2/2013 | Peitzke et al. | |
| 2015/0048622 A1* | 2/2015 | Schegerin | H02J 15/007 290/1 R |
| 2016/0003224 A1* | 1/2016 | McGrath | F03D 9/16 185/32 |
| 2022/0402700 A1* | 12/2022 | Forrest | F03G 3/00 |

* cited by examiner

*Primary Examiner* — Carlos Amaya
(74) *Attorney, Agent, or Firm* — Stephen J. Kenny; Foley Hoag LLP

(57) ABSTRACT

A system for gravity-powered storage including a substantially vertical shaft, the substantially vertical shaft disposed underground, the substantially vertical shaft spanning a height, at least one module disposed within the shaft, the module comprising a weight, at least one module driver assembly affixed within the substantially vertical shaft, the module driver assembly comprises an electric motor/generator and a conveyor component disposed within the shaft, the conveyor component coupled to the module driver assembly, the conveyor component affixed to at least one module, the conveyor component configured to move the module within the shaft via the module driver assembly.

20 Claims, 9 Drawing Sheets

MODULAR GRAVITATIONAL ENERGY STORAGE SYSTEMS

CROSS REFERENCE TO RELATED APPLICATIONS

This application is a Continuation of U.S. patent application Ser. No. 17/237,048, filed on Apr. 22, 2021, which claims priority under 35 USC 119(e) to U.S. Provisional Application No. 63/013,820, filed on Apr. 22, 2020. The entire contents of each of these applications is hereby incorporated by reference.

FIELD OF THE DISCLOSED SUBJECT MATTER

The present invention pertains to energy storage systems, particularly those in which the system is powered by gravity which uses motor/generators, or pump/turbines, or some other type of device to lift and lower modular units of mass between a higher elevation and a lower elevation in order to store electrical power in the form of potential energy, as the mass is raised, and then to later release it back into electrical power when the mass is lowered.

BACKGROUND OF THE DISCLOSED SUBJECT MATTER

There is a fast growing demand for large-scale energy storage which is needed to support renewable energy and therefore to help mitigate the risks of climate change. Energy markets around the world are already replacing carbon-based fuels with renewable energy sources. However, one of the largest obstacles to this growing development of renewable energy is that we lack enough energy storage to compensate for the variability of weather dependent energy generation. Simply put, the sun doesn't always shine and the wind doesn't always blow. This will become an increasingly large problem as renewable energy becomes a larger percentage of our power grid. To solve this problem, we need cheaper and more efficient energy storage solutions. This disclosed invention provides such a solution on a large scale. This solution both solves a fast growing market need and also helps mitigate the dangers of climate change.

The following patents disclose various systems and devices for energy storage: U.S. Pat. No. 7,944,075 to Boone discloses a wind turbine-based energy storage system and method using heavy weighted devices. The Boone patent discloses an energy storage system, and related method, comprising a plurality of wind turbines, each with a vertical shaft that passes through a support platform. One or more braces may be affixed to each vertical shaft at one end of this platform, at an angle of less than 60 degrees, preferably about 45 degrees. At least one heavily weighted device is configured and disposed to be raised with rotation of the wind turbine about its vertical shaft. The subsequent lowering of that weighted device generates electrical energies for immediate use. Alternatively, the weighted device may be suspended for storage of energy and subsequent use. Preferred embodiments include at least one energy storage system for holding excess unused energy. Representative devices include a weighted cylinder on a shaft or cable, and one or more railcars on a series of inclined tracks.

U.S. Pat. No. 7,281,371 to Heidenreich discloses a compressed air pumped hydro energy storage and distribution system. The Heidenreich patent includes a first reservoir of water and a second reservoir of air and water. An air pressure source, connected to the second reservoir, develops a pressure head in the second reservoir. A pump/turbine-motor/generator, received by the first reservoir, is connected to a regional energy grid. During peak demand periods, the pressure head forces water through the pump/turbine-motor/generator to generate power, delivered to the grid. During low demand periods, the pump/turbine-motor/generator pumps water back to the second reservoir, regenerating the pressure head. A third air reservoir interconnected with the second reservoir and a gas turbine generator can be used to generate power during peak demand periods. The reservoirs can be tunnels or abandoned mines, reinforced and sealed by pressure grouting and/or an internal liner, maintained well beneath the earth's surface and intersecting the path of the grid.

U.S. Pat. No. 9,869,291 to Fiske discloses a system and method for storing energy. The Fiske patent discloses a system for storing energy which includes a body and a shaft having walls defining an internal volume for containing a fluid, a seal member disposed between the body and the walls of the shaft, and a fluid passage in fluid communication with the shaft. The body is disposed within the internal volume of the shaft for movement with gravity from a first elevation position to a second elevation position within the internal volume of the shaft. The seal member divides the internal volume into a first portion located below the body and a second portion located above the body. The fluid passage communicates fluid with the first portion of the interior volume of the shaft. The system further includes a pump/turbine operatively coupled with the fluid passage to drive a motor/generator to generate electricity upon movement of the body from the first elevation position to the second elevation position.

U.S. Pat. No. 9,726,159 to Littman discloses units and methods for energy storage. The Littmann patent discloses a system for storing energy that includes a body and a shaft having walls defining an internal volume for containing a fluid, a seal member disposed between the body and the walls of the shaft, and a fluid passage in fluid communication with the shaft. The body is disposed within the internal volume of the shaft for movement with gravity from a first elevation position to a second elevation position within the internal volume of the shaft. The seal member divides the internal volume into a first portion located below the body and a second portion located above the body. The fluid passage communicates fluid with the first portion of the interior volume of the shaft. The system further includes a pump/turbine operatively coupled with the fluid passage to drive a motor/generator to generate electricity upon movement of the body from the first elevation position to the second elevation position.

Nonetheless, despite the ingenuity of the above systems and devices, there remains a need for improved energy storage systems that can efficiently store large amounts of electric power and release it back into the power grid when needed.

BRIEF SUMMARY OF THE INVENTION

The present invention provides novel designs and improved methods for the construction and operation of a gravity powered energy storage facility. This facility might also be called a gravity battery or a gravitational potential energy storage device. In a preferred embodiment, the device converts electricity into gravitational potential energy and vice versa by raising and lowering massive modules between a higher elevation and a lower elevation. These modules could maximize their mass with weight container units consisting of any heavy medium, such as water, stone, metal, concrete, compacted earth, etc.

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

The facility is comprised of elements such as

A power conversion system connecting the system to the outside grid. This power conversion system will control incoming and outgoing energy between the grid and the installation.

A collection of modular, massive weights, either tethered together in a line or gathered together in some other configuration. If tethered together in a line, the group may be thought of as a train which may run horizontally, vertically, or along any path.

An upper storage location, which could typically be a suitable area for storing the collection of weights at a high elevation. Note that the term "high" only has meaning relative to the "low" elevation. The high elevation could be at ground level because the lower level could be below ground. This storage location could be a horizontal track comprised of a set of supporting rails at ground level.

A lower storage location, which is typically a deep vertical shaft dropping to a low elevation. For example, this shaft could be a repurposed mine shaft, or it could be a newly constructed shaft drilled into bedrock.

A viable mechanism for transporting the collection of weights from the upper storage location to the lower storage location and capturing the potential energy of the system as the weights fall.

A viable mechanism for transporting the collection of weights from the lower storage location to the upper storage location which would require expending energy to lift the weights.

A viable mechanism for supporting each section of weight and distributing the aggregated load of the weights to one or more motor/generators. This mechanism must distribute the load in a manner which ensures that no motor/generator is overloaded. It should also optimize the load so that each motor/generator typically operates within its optimal parameters. If the installation is to support a series of weights in a train, the design should be able to scale up to a very large quantity of weights by adding more modules. This implies that it is not possible or not practical to hang all of the tethered weights off of a single supporting tether or a limiting small number of tethers which hold the entire train. Instead, each section of weight should be supported by its own modular supporting component which is also connected to one or more motor/generators in order to support and transmit the gravitational force from the module to those motor/generators. By virtue of this modular design, even if each module of the train were to be physically connected, the force of each module should not greatly impact any of the other modules because each module will be independently supported.

The present invention comprehends an energy storage system which converts electricity into gravitational potential energy, and vice versa, by raising and lowering heavy modules between a higher elevation and a lower elevation.

The modules can include heavy components comprised of any heavy medium, such as but not limited to, water, stone, metal, concrete, or compacted earth. The system's gravitational potential height is optimized by utilizing an underground vertical shaft or some other source of large height differential. The system's gravitational potential weight is optimized by implementing a modular design which can evenly distribute a large quantity of mass between many heavy weight modules and many corresponding supporting elements. This in turn enables the system to distribute gravitational forces to many motor/generator units which are therefore enabled to lift or lower the weights and thereby expend or produce electricity. The motor/generators are electrically connected to a power conversion system which can manage the exchange of electricity between the energy storage system and an external power grid or other outside connection.

In an embodiment, the lower storage area of the energy storage system may be mined out of bedrock or other earth material, or may be adapted or constructed from the site of an abandoned mine or some other preexisting excavation.

In another embodiment, the upper storage area of the energy storage system may be above ground, external to the vertical shaft, and located so as not to obstruct the movement of other weights from leaving the vertical shaft.

In another embodiment, the upper storage area of the energy storage system may comprise a horizontal rail line placed at ground level similar to a train rail, having weights which are supported by that rail and attached together so that they may be pulled in one continuous motion to facilitate travel to and from the vertical shaft.

In another embodiment, the energy storage system comprises a modular design which allows for a scalable number of many cables or tethers to support sections of weight so as to avoid supporting all of the weight with one tethered connection. This design resolves the problem caused when trying to support a continuous series of mass inside a vertical shaft with one single source of support which would require the source to have a problematically large size which would prevent the cable or tether from effectively connecting to a motor/generator or similar lifting/lowering device.

In another embodiment, the energy storage system comprises a gear-shift-transmission mechanism to adjust the ratio between the weights' velocity and the effective force exerted by the motor/generators. By adjusting the velocity of the falling mass, the system can maintain the optimal force on the motor/generators at all times. This mechanism may apply the principles of a variable speed transmission so that the adjustment could be continuous without discrete steps.

In another embodiment, the energy storage system comprises a pumped hydro solution which is used to facilitate the upward and downward movement of the weights. In this embodiment, water or some massive fluid serves as a modular weight though a design which stores modular volumes of fluid in a series of isolated underground cavities which can be independently connected or disconnected to a pumped system. In such a system, the ease of maintenance and ease of facility expansion is improved by ensuring that independent isolated underground cavities of the facility could be hydraulically isolated without disrupting the facility's general operation. Finally, such a system may be built in a region with suitable geothermal properties, and wherein the water or fluid medium could absorb heat from underground chambers which could then be leveraged for geothermal power generation which could augment the economic value of the facility which otherwise might be used solely for energy storage and not energy generation.

In another embodiment, the heavy modules of the energy storage system described herein are adapted to absorb, store, and release thermal energy. This could be accomplished by the module being adapted to absorb, release, and/or hold some form of thermal material, such as thermal gas or liquid which may be filled and unfilled. Likewise, a modular solid component adapted to store, absorb, and release thermal energy may be attached and detached. The thermal material may be strategically located in the presence of varying thermal environments in order to charge and discharge thermal energy. For example, a module may be dropped underground where the underground temperature is different from the ambient temperature above ground. Similarly, the module could be adapted to hold a pressurized and/or refrigerated tank of liquid air. As explained below, this air can be utilized in a cycle which leverages natural geothermal heat in order to help lift some of the system's weight, and this can increase the system's overall efficiency. In such a system, when above ground, the system expends energy to convert the air into a liquid by reducing its temperature and/or by increasing its pressure (as understood through the ideal gas law: $PV=nRT$). This makes the air dense as it turns into a liquid. Then, below ground, the air is released into the shaft where it can come into contact with the shaft walls with geothermal temperatures. If the liquid air was not already cold and depressurized, it will become cold as it is depressurized as understood by the ideal gas law. As this cold air comes into contact with the shaft walls which are comparatively very hot, the air will be heated again. This heat lifts the air and creates extra air pressure at the top of the shaft which can be captured into power again. For example, this pressurized air can be passed through a turbine generator. Additionally, since the modules are now lighter—having emptied the heavy compressed air, there is less weight to lift than they had when generating power on the way down. As is evident, even though both gravitational energy storage and compressed air energy storage have some inefficiency (they lose some energy over the course of their cycle)—by combining them in this way, the efficiency of both is improved by utilizing natural geothermal heat. The gravitational energy benefits from the cycle of the air gaining and losing weight. The compressed air energy storage benefits from the temperature differential as it's translated between one natural temperature and another.

The presently disclosed invention represents an improvement over the prior art. The novel design has a fundamental advantage over existing gravity battery designs because we have found a way to maximize both key properties: height and weight. The known prior art designs for gravity battery systems are fundamentally limited by their constrained effective heights, weights, or both.

The presently disclosed invention is designed to utilize maximum height. The height is maximized by digging deep underground—around a mile deep. A mile is much greater than the height of any systems using above-ground tower designs, rail-based solutions, or mountainous terrain solutions. The present invention employs well-proven, low-risk mining techniques to facilitate maximized heights. The expense of excavation is cost-effective due to the enormous benefit of the height gained. In some circumstances, an abandoned mine shaft can be utilized to save some construction expense. These economics are well researched as shown in the inventor's feasibility study of underground pumped hydro, *Underground Pumped Hydroelectric Storage: A Feasibility Study*, Eric Chaves, Jan. 28, 2020, which is herein incorporated by reference in its entirety.

Some prior art systems also utilize underground digging, but those known systems suffer from weight constraints. To remove these weight constraints, the presently disclosed invention leverages a modular design which maximizes weight by enabling the utilization of the entire volume of excavated bedrock. Without a modular solution, previous designs required a single, large "piston" of mass stored inside an underground shaft. This piston is either (A) suspended with cables or (B) supported by water from below. Both of these cases have weaknesses.

In Case A, hanging a large heavy piston with a single cable, it is not practical to lift the weight of a piston which is thousands of feet tall. The weight would become so heavy that it would require cables of such large thickness that they could not wind around any winch. As the height of a piston scaled up, such a design would also need to scale up the number of cables. This presents its own problem which is not addressed by prior art. The present inventors provide a novel solution for this challenge in a variation of the present invention, disclosed herein as illustrated in FIGS. 11-13.

In Case B, using water to support a piston from below, a system is able to support more weight, but this water detracts from the efficiency of the system. This is simply because the weight of the water must be moved in the opposite direction as the heavy piston. Therefore, even though a solid-mass weight is about 2.5 times heavier than water, the effective weight of the system becomes only 1.5 times the weight of water, resulting in very little benefit for the extra complexity of the system. It would likely be cheaper to just use underground pumped hydro in the first place. This is discussed in more detail in the inventor's feasibility report for underground pumped hydro Underground Pumped Hydroelectric Storage: A Feasibility Study, Appendix 16.1: Calculations for Pumped Storage with Heavy Piston Design, herein incorporated by reference.

Both Cases A and B present height limitation problems as well. Because the piston is constrained inside the shaft, it limits its own height. It is obvious that if the piston is half the height of the shaft, it can only travel its own height before hitting the bottom or top. Any additional mass that is added only detracts from the height it can travel and vice versa.

In an embodiment, the present invention is a modular system that solves the weaknesses above by enabling each module to support its own weight and to travel fully in and out of the shaft. This enables the scaling up in both weight and height without any practical limits except those imposed by shaft boring technology. This shaft boring technology is well understood and can comfortably reach depths beyond one mile.

In an embodiment, a shaft is mined into bedrock and each module of this system runs on a track attached to that shaft's bedrock wall. Each modular unit contains a motor/generator inside of it which allows it to "crawl" along the track. An electric rail is used to power all of the units. Each unit is automated and controlled by software to coordinate its motion along the track. The units will be coordinated to move in tandem, all of them moving either up or down together in a virtual train. Each unit will use sensors to ensure that they always keep a safe distance from its sibling units. These sensors will also determine if and when a unit needs maintenance. At the top of the shaft, the modular units can turn horizontally onto a long track running parallel to the ground. This track can be dug into a shallow trench, or it can be covered with solar panels or some other useful utility so as not to waste any real estate. By shaping this installation into a giant inverted L of self-supporting modules, the present design achieves an optimized solution, in which a deep shaft is completely filled with heavy weight, with the shaft being fully emptied at ground level.

In another embodiment, an installation track is arranged as described above into a giant inverted L with a horizontal track at ground level and a vertical track dug into bedrock, and which also includes an additional horizontal track at the bottom of said vertical track which is also bored into bedrock and which allows the continuation of the track at the bottom of the vertical shaft for the purpose of clearing modules from the bottom of the shaft so that modules above are not blocked from traveling to greater depths of the shaft.

Design Variation A

The present invention encompasses several design variations for the disclosed modular energy storage system including a variation in which the weights in the modular system are stacked one at a time, or one group of weights at a time. In this solution, the weights do not need to be tethered together in a train. Instead, they are lifted and lowered between elevations one at a time, or one group at a time. The weights would stack securely inside the vertical shaft, supported as needed by the shaft walls for stability. The weights would be supported from above by a crane or other lifting device. The crane would attach to one or more weights and lower them to the bottom. The crane would then release the weight, retract its tether back to the top, and then it would grab the next weight waiting at the top. This cycle would repeat until the weights are fully stacked inside the vertical shaft. To remove the weights, the process would run in reverse. In this solution, the weights should be stored in the upper storage area in some convenient manner. A conveyor design may be used to move weights closer or further away from the lifting device in order to accommodate the lifting and lowering cycle.

In a similar embodiment, a crane system utilizes multiple tethers to lift and lower heavy modules onto multiple vertical stacks of heavy modules. Through this method, this system could lift some tethers while lowering others. This may assist the system in smoothing out the power load. For example, this system might have four crane tethers—each tether assigned to raise and lower weights in one quadrant of the shaft where a weight might fill most of the quadrant's surface area. This system would have two processes where each process would use a pair of tethers that were opposite to one another so that the weight would be distributed symmetrically. With this approach, one process could lower weights, and therefore generate power, while the other cycle could retract its tethers to prepare for the next drop. This process could then begin to lower its weights, and therefore generate power, as soon as the previous process finished. In this way, the power output can remain constant. This design variation is further illustrated in FIG. 14.

Design Variation B

The present invention further encompasses a variation for the disclosed modular energy storage system including a variation in which the weights in the modular system are supported by multiple tethers. In this variation, a plurality of tethers such as high strength cables are arranged in pairs. Each pair extends down into the shaft and connects to a load-bearing bracket which can support a section of the weight. This load-bearing bracket might be a flat ring which could catch a weight or section of weights just as they begin to drop into the shaft. In this way, the ring, and therefore the pair of cables, would counteract the gravitational force of the weight. The cables are connected above to a motor/generator. This connection may be direct or indirect. For example, the cables may be wrapped around an axel turned by a motor/generator, or they may be pulled by an intermediate connection to a gearbox or similar transmission unit which may adjust the ratio of velocity and force in order to optimize the RPM speed, force load, and the operation timing of each motor/generator. This variation is illustrated in FIGS. 11-13.

Design Variation C

The present invention encompasses another design variation for the disclosed modular energy storage system in which the weights in the modular system are supported from load-bearing elements secured to the shaft walls. In this variation, load-bearing elements such as sections of a gear-toothed track are secured to the shaft walls using bolts or some other method. The installation's modular weight units are then able to support their own weight by interacting with the load-bearing track and utilizing one or more motor/generators embedded inside the module unit. To achieve this, the motor could be attached directly to one piece of the weight unit while turning a different independently rotating section of the weight unit. These two or more independently rotating sections could match with separate load-bearing elements on the shaft wall to facilitate motion. This interaction could utilize any common method of mechanical engagement such as gears, roller chains, a high-friction surface, or some other actuator which is able to exert force on the shaft walls through a controlled interaction.

An example of such an interaction is a vertical gear track attached to the shaft wall which would form a rack and pinion gear set with a rotating gear controlled by the motor/generator inside the weight. This rack and pinion interaction would enable the motor/generator to exert an upward force and therefore lift itself or support a controlled descent using regenerative braking. Because the motor/generators are embedded inside each modular unit, an electric power line must be connected between each module and the system above. To accomplish this, an electrified rail, electrical wiring, or similar electric conveyance device could be used to transmit electricity between the modules and the power conversion system above. The modules could exchange power between this electrified rail or other electric conveyance device through an electric rail "shoe" connection—similar to an electric train—or through some other method. Finally, if the motor/generators are integrated inside the wheels of a module driver assembly, power can be delivered to said motor/generators through the module driver assembly wall at the point of axial rotation. Some kind of conductive rotary slip ring or similar solution could be used to support independent rotation of these elements. This variation is illustrated in FIGS. 1-6.

Design Augmentation A

The modular energy storage system of the present invention in each variation may further comprise another design augmentation including a secondary energy storage device such as a flywheel, a battery, or some other device to smooth out the system's power load profile and/or to supplement the installation's power capacity. In each embodiment, it may be desirable for the facility to absorb or disperse some amount of power to or from these secondary energy storage devices in order to smooth out dips or surges in the facility's power load profile for some amount of time. For example when the system is initially starting or stopping its discharge cycle, it may be not possible or practical to ramp up or ramp down the power load profile exactly as desired with gravity storage alone.

This secondary energy storage system could be partially or fully distributed and integrated into the modules themselves. For example, some amount of the module's weight could be comprised of a heavy flywheel or a heavy chemical battery.

Design Augmentation B

The modular energy storage system of the present invention in each variation may further comprise another design augmentation including enabling the series of weights to tether or untether as needed.

It may be desirable for the design of a facility to not require that all of the modular weights in a train to stay precisely together. For example, it may be desirable to introduce a delay between the time when each module is raised or lowered. There are various mechanical solutions which can achieve the goal of this design augmentation, and they are all similar in principle. For example, some kind of gripping element could be latched and unlatched. Alternatively, this goal could also be achieved through the means of virtually attaching the units, that is, by using an automated solution in which units are controlled individually and therefore can be operated either in tandem or in separated groups. This method of tethering or untethering orchestrated groups is an automated solution in which the modules are arranged in a line or queue, but they are not necessarily tethered physically together. The movement of each of these weights or weight sections is programmatically controlled through software which controls motors which move the weights forward or backwards however is desired. In this way, a "virtual train" can attach and detach groups of weights by simply synchronizing or un-synchronizing the position and motion of the units. With this modular, virtual train, the electric load can be customized simply by changing the quantity and speed of the weight units being dropped. It is noted that a transmission's gear ratio could also be changed to serve this purpose. As a final note, it is mentioned that the system can protect against some failing units through redundancy by physically grouping some motor/generators together. These connected motor/generators could then be thought of as a weight unit which could be controlled independently of other weight units. This would allow for the possibility that some motor/generators in the group could fail, and in such a scenario, the connected adjacent motor/generators could compensate for the loss of power.

Design Augmentation C

The modular energy storage system of the present invention in each variation may further comprise another design augmentation facilitating maintenance of the modular system. The installation should be fully prepared for the possibility that a motor/generator might fail and require maintenance. As mentioned above, motor/generators may be matched in sets which are physically connected so that in the event that one fails, the others could compensate for the missing power and could support the failing module as a train engine supports an unpowered train car. But furthermore, the system may be designed to ensure rapid maintenance in order to minimize system delays. To achieve this, the system is designed to identify any module in need of repair and to use a crane system or similar solution to easily remove that module from the train of modules. The system would then be immediately operational again, while the failed module could be repaired asynchronously without delaying operation.

REFERENCE NUMERALS IN THE DRAWINGS

Figure 1:
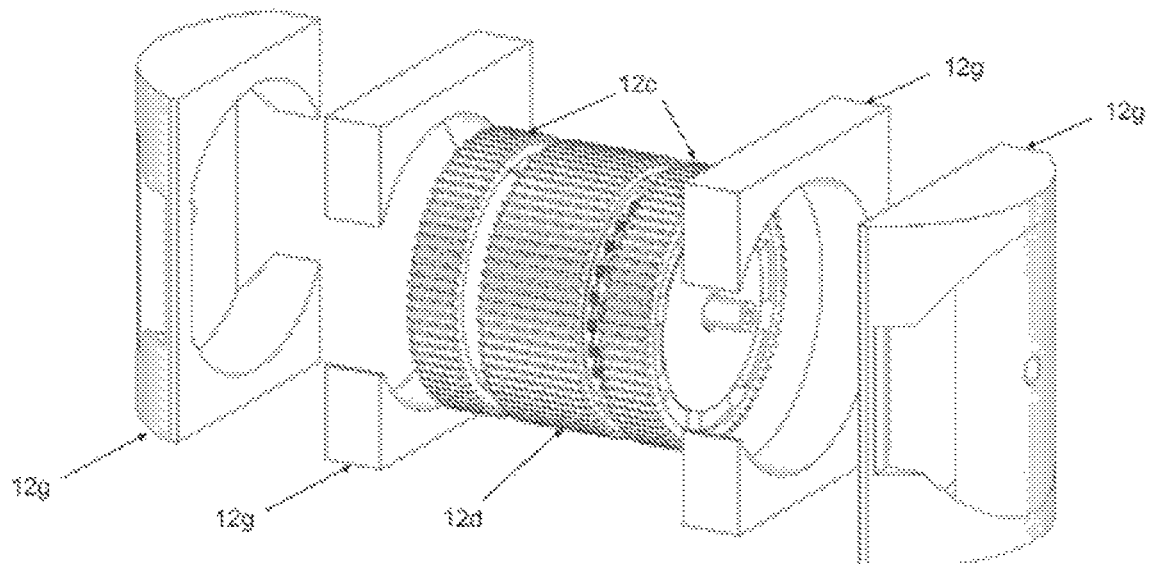
FIG. 1 is an exploded view of the module driver assembly, revealing module driver assembly wheels with geared surfaces and integrated motor/generator units and integrated gear-reduction mechanisms.

1. Ground surface
2. Bedrock
3. Horizontal pathway, above ground, or excavated just below grade
4. Horizontal pathway, mined out of bedrock
5. Vertical pathway, mined out of bedrock
6. Pathway transition portion between horizontal and vertical
7. Load bearing track
   a. Load bearing track—outer track pair
   b. Load bearing track—center track
   c. Load bearing track, in spiral ramp formation
   d. Load bearing track—geared threads
8. Module with driver assemblies and weight container units
9. Module weight container unit
10. Module power connection to electric rail (i.e. an electric rail "shoe" connection)
11. Module controller
12. Module driver assembly
    a. Module driver assembly axle
    b. Module driver assembly wheels with geared surface
    c. Module driver assembly wheels with integrated motor/generator units
    d. Module driver assembly wheels with integrated gear-reduction mechanism
    e. Module driver assembly motor/generator stator
    f. Module driver assembly motor/generator stator
    g. Module driver assembly casing
13. Module secondary storage—chemical battery energy storage system
14. Module secondary storage—flywheel rotational energy storage system
15. Module power connection to module controller
16. Module power connection to secondary storage system
17. DC electric rail (i.e. "third rail")
    a. DC electric rail cover
    b. DC electric rail connection point
18. DC switch
19. AC breaker
20. Power Conversion System (PCS) including typical power station components such as Inverts, Transformers, Protection Switches and Breakers, and Energy Management systems (EMS)
21. DC power connections
22. AC power connections
23. External power grid
24. Module unit with motor/generators—one of many, in train formations along pathway
25. Tunnel entrance where pathway may transition between ground surface and excavated area.
26. Module-supporting crane assembly with motor/generators which can move modules vertically and also with crane arms which can move modules laterally in order to stack and unstack them.
27. Module-supporting cable or tether
28. Module-supporting conveyor belt
29. Module-supporting cable guiding channel
30. Module-supporting load-bearing bracket
31. Module-supporting load-bearing bracket latching mechanism with lever and pin

DETAILED DESCRIPTION OF AN EXEMPLARY EMBODIMENT

Figure 5:
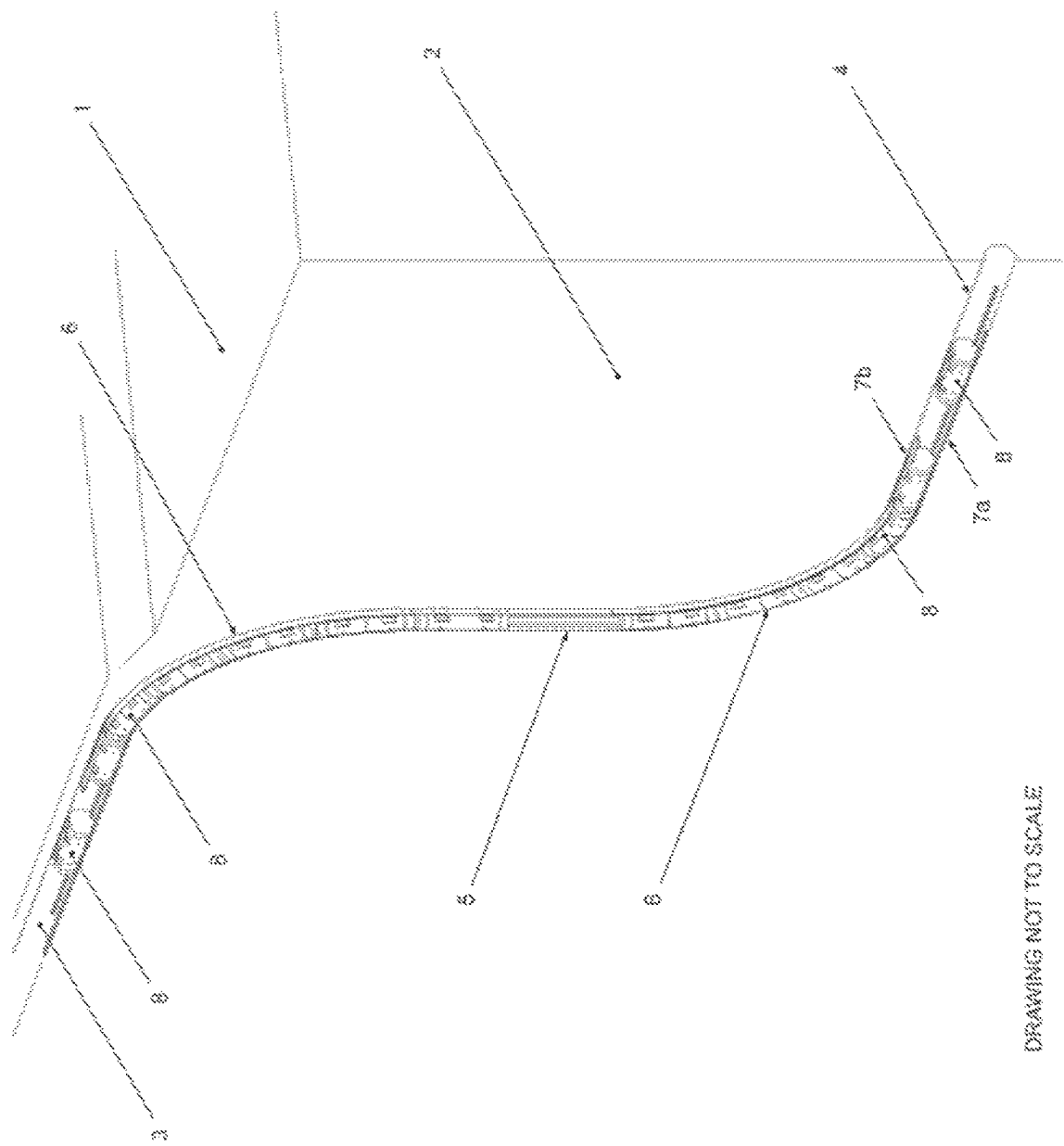
FIG. 5 is an axonometric view of an installation with virtual trains of modules along the installation's rail-guided pathway. The drawing shows a vertical pathway section mined out of bedrock, and two horizontal pathway sections—one above ground, and one underground also mined out of bedrock. Notes: the drawing is not to scale, and the various locations of the modules are to show various visual examples at once, and they do not represent a typical installation layout of modules.
Figure 6:
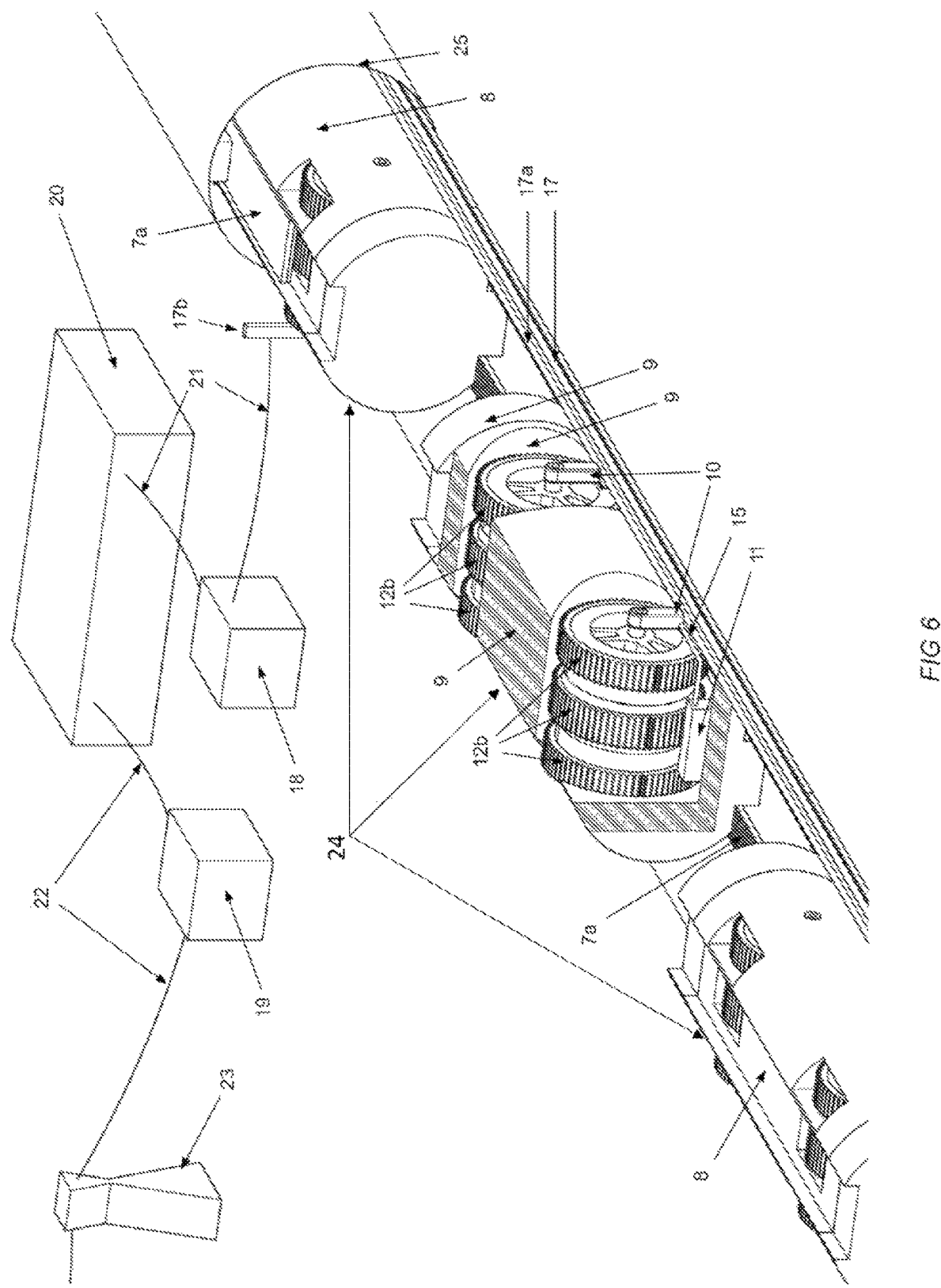
FIG. 6 is an axonometric view of an energy storage system of modules connected to an external power grid, and integrated with a power transmission system comprising components such as a Power Conversion System, a DC electric rail, and various other components. One module is shown in partial section view to reveal internal components such as the module driver assembly wheels with geared surfaces.
Figure 7:
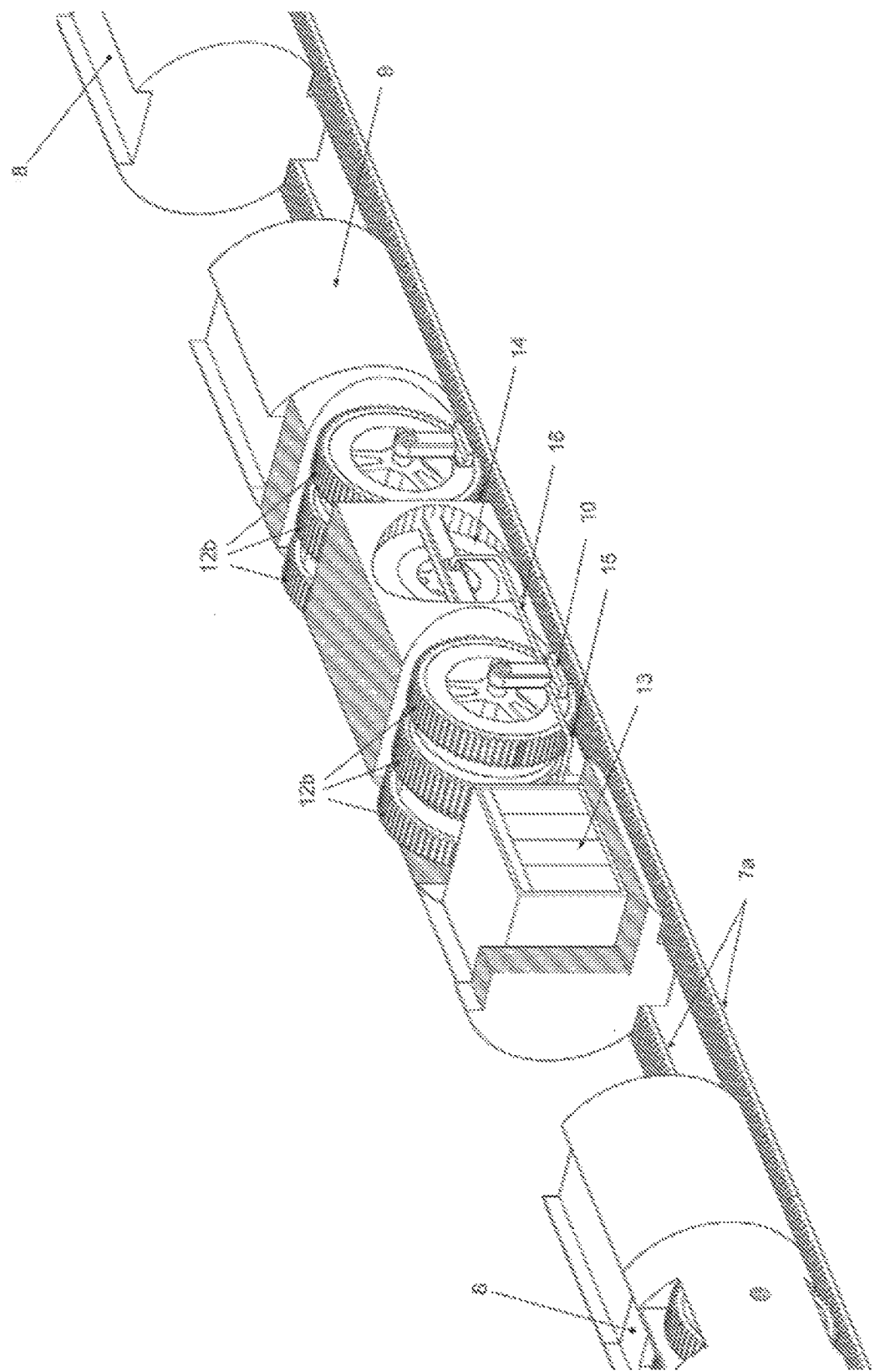
FIG. 7 is an axonometric, partial section view of a module with secondary storage elements. The module is on a track next to adjacent modules in a virtual train. The partial section view reveals the internal components such as the module driver assembly wheels with geared surfaces, and two secondary storage units of different types—one is a chemical battery energy storage system, and another is a flywheel rotational energy storage system.

Illustrated in FIGS. 5-7 is a modular gravity-powered energy storage system which comprises a plurality of heavy modules which together have a desirable aggregated effect on the energy storage system. As illustrated in FIG. 7, each module may contain or integrate one or more secondary energy storage technologies such as but not limited to a rotational energy storage system (e.g. flywheels), a chemical battery energy storage system (flow batteries, Li-ion batteries, or other), or a thermal energy storage system. The weight of this secondary energy storage device contributes to the gravitational potential energy used by the gravity storage module and the secondary energy storage technology contributes additional energy storage potential to the overall system. A mechanical and/or software system connects/integrates the gravity storage system and the secondary storage system.

Figure 3:
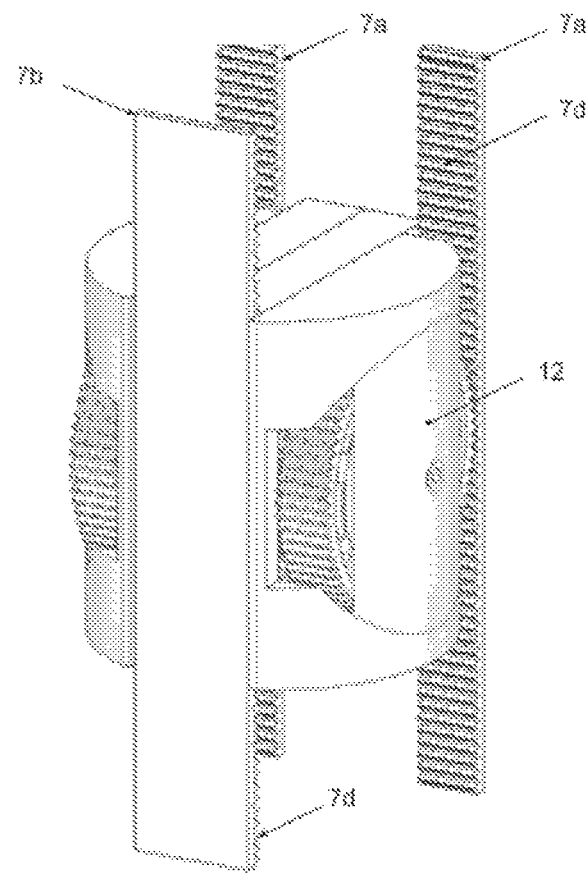
FIG. 3 is an axonometric view of a module driver assembly connected to a vertical section of track. The module driver assembly unit is shown isolated, without any weight container units.

FIG. 3 shows a gravity-powered energy storage system, comprising a track which spans a large height and a plurality of heavy modules which can locomote along that track wherein said track is arranged underground into a bedrock shaft. The shaft can be any advantageous depth, preferably greater than 0.5 miles deep. (Greater height gives longer energy storage duration). FIG. 3 also shows various sections of track—some arranged substantially vertically and some arranged substantially horizontally—and transition portions between said substantially vertical and substantially horizontal portions.

FIG. 6 further shows the system comprising at least one power conversion system and a number of power components to transmit power between said modules and said power conversion system. FIG. 6 also shows at least one external power grid wherein said power conversion system further transmits power between said modules and said external power grid.

Figure 2:
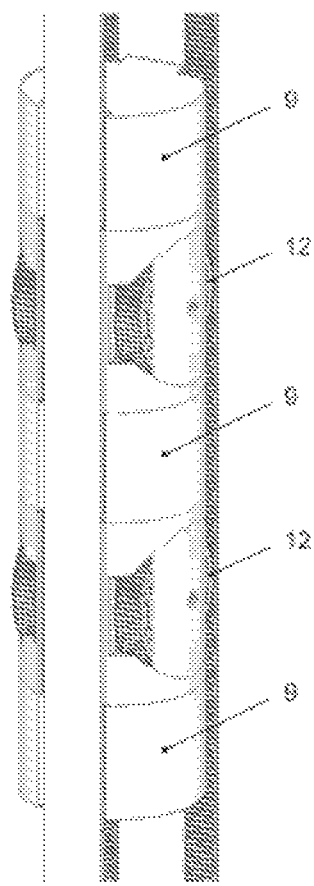
FIG. 2 is an axonometric view of a module along a vertical section of track. The module has two module driver assembly units and multiple weight container units.

FIGS. 1-4 illustrate a module design comprising one or more module driver assemblies which include motor/generators to drive the module along the track as well as to generate power through a regenerative braking effect as the motor/generators slow the module's natural rate of descent from the gravitational force. These figures further show the module driver assemblies comprising gears which connect each module to said track and enable the module to locomote itself along the track in a secure and controlled manner. FIG. 2 further shows various module weight container units added to increase the density of the module.

Figure 13:
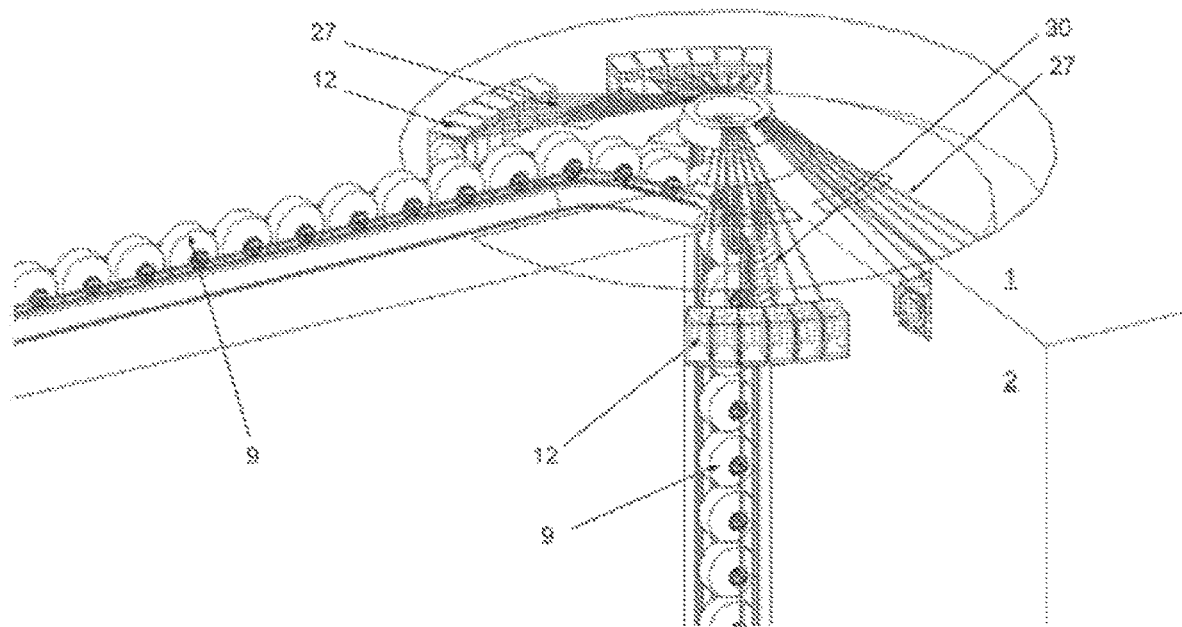
FIG. 13 is an axonometric, partial section view of a cable-based system design with multiple cables designed to support multiple modular weights with a system of load-bearing brackets.
Figure 14:
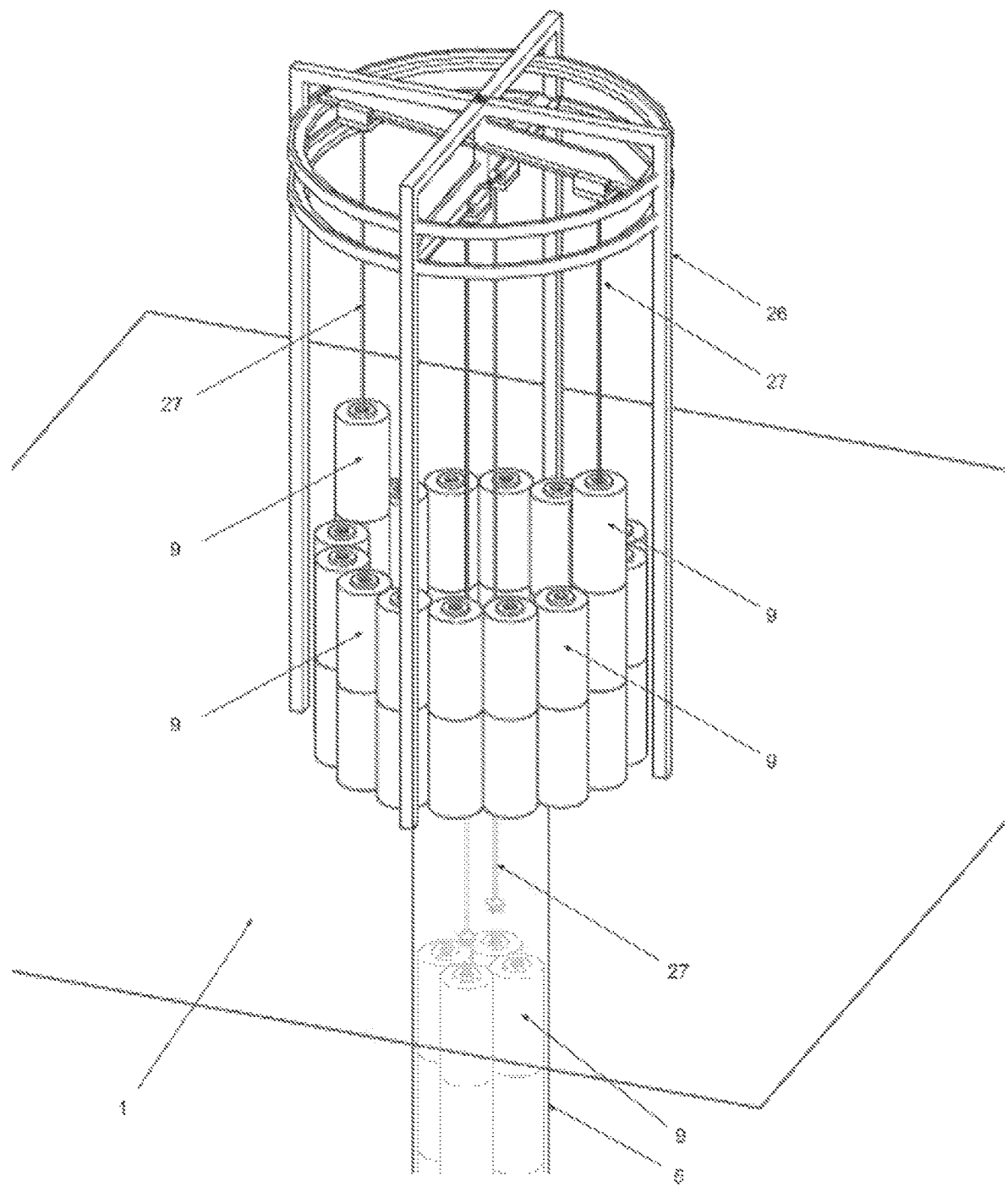
FIG. 14 is an axonometric view of crane-based system design where the crane assembly is located at ground level over a substantially vertical pathway in the form of a shaft. The crane is shown placing or removing modules from radial stacks around the shaft to move them to or from the vertical shaft.
Figure 15:
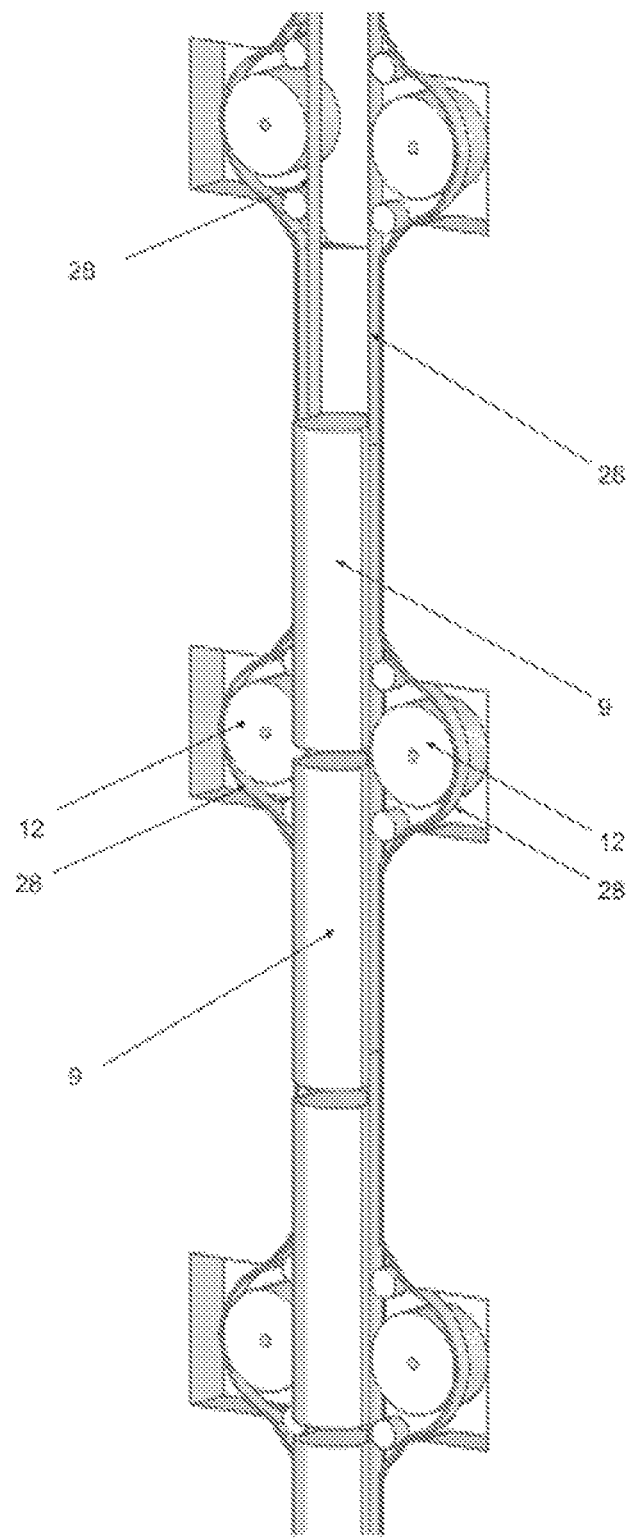
FIG. 15 is an axonometric view of a conveyor-based system design embedded in a vertical shaft. The illustration shows module driver assembly units installed in cavities excavated into bedrock. These module driver assembly units drive a conveyor belt mechanism which interacts with modular weights inside the shaft to lift them or to slow the module's natural rate of descent from the gravitational force which also provides a regenerative braking force to the motor/generator unit thereby producing power.

FIGS. 13-15 show various embodiments of the present energy storage system in which the system comprises motor/generators which are external to the heavy modules. In these various embodiments, said external motor/generators may leverage some connecting device such as cables or conveyor belts to exchange a force with said heavy modules which in turn locomotes said modules along said pathway.

Figure 4:
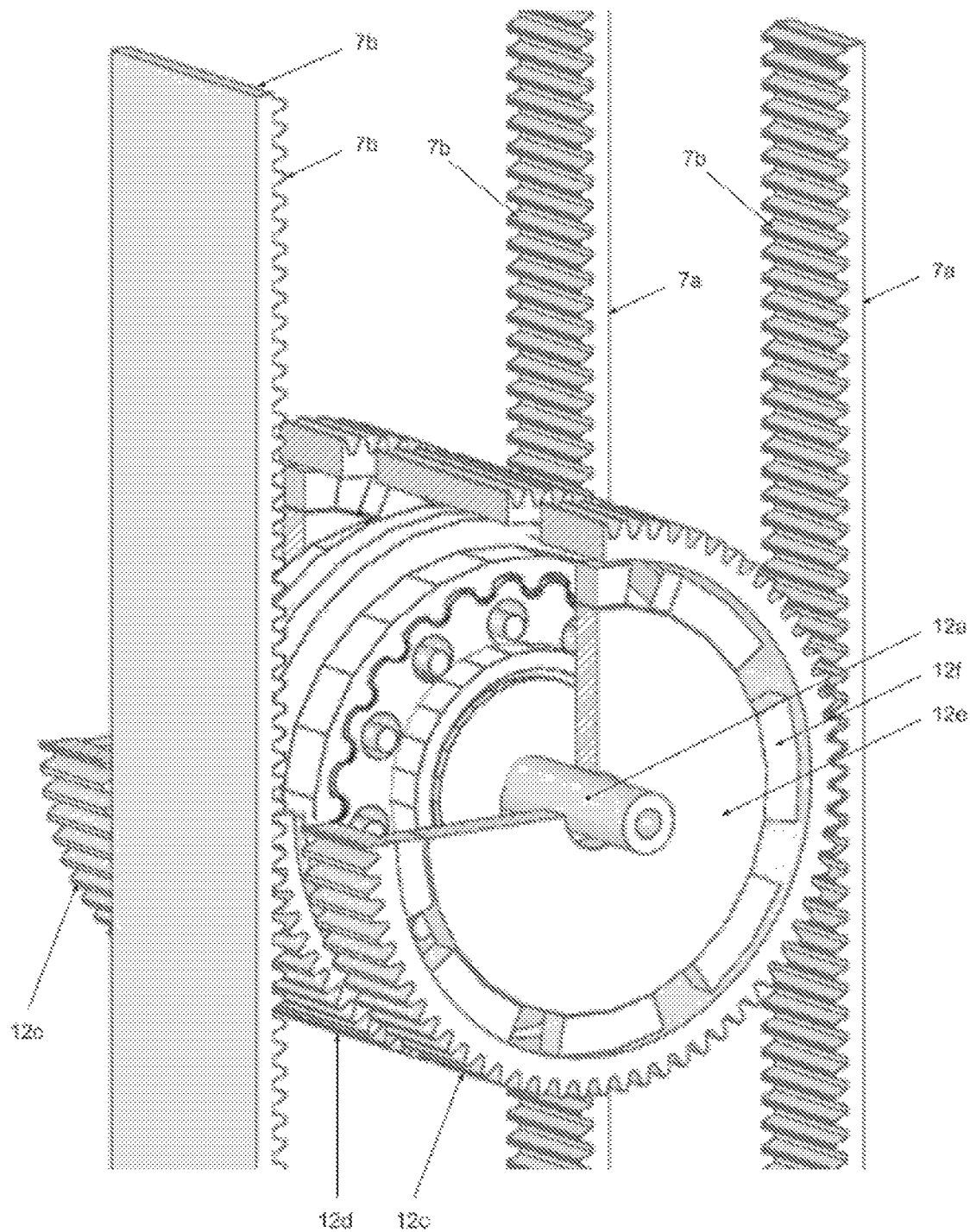
FIG. 4 is an axonometric, partial section view of the inside of a module driver assembly unit. The casing is removed to reveal inner components. The driver assembly unit is shown isolated, without any weight container units. A partial section cuts away the assembly wheels with geared surfaces to reveal integrated motor/generator units and integrated gear-reduction mechanisms. In this illustration, the gear-reduction mechanism is a cycloidal gear assembly.

FIG. 4 illustrates a module driver assembly for a module of the present system comprising three wheels with geared surfaces—two outer wheels and one center wheel. Each outer wheel includes an integrated motor/generator to locomote said module along the track and to generate power from the deceleration of said module along said track. The center wheel includes an integrated gear-reduction mechanism. The outer wheels are connected to the center wheel through a module driver assembly axle. The outer wheels' motor/generators may exert forces on the center wheel's gear-reduction mechanism which causes the center wheel to rotate relative to the outer wheels. The gear-reduction mechanism may cause this rotation to have decreased speed and increased torque. FIG. 4 further shows each wheel with a geared surface which connects said module to the track which has a matching geared surface. These geared surfaces together can be understood as rack and pinion gears. The tracks which match the outer wheels are on the opposite side of the pathway as the track which matches the center wheel. This allows the wheel's opposite rotation to exert a force in the same direction along the pathway which enables the module driver assembly to drive the module.

Figure 8:
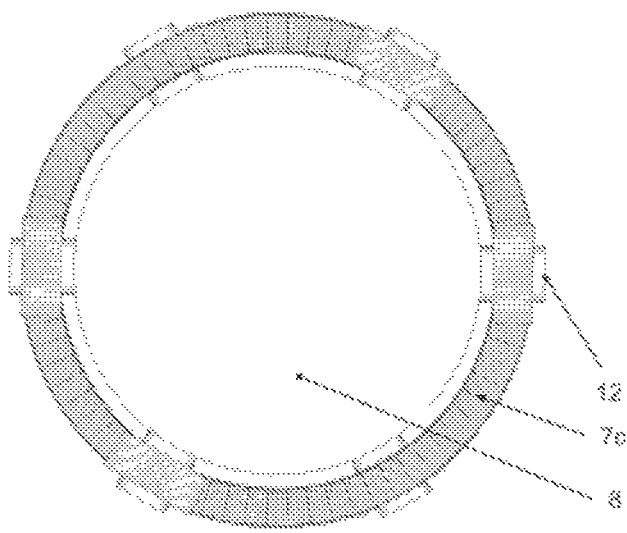
FIG. 8 is a top view of a spiral track based system design. The top view of a module is shown with various module driver assembly units around its perimeter. Some module driver assembly units are shown above the visible length of track, and some are obscured because they have turned under the visible length of track.
Figure 9:
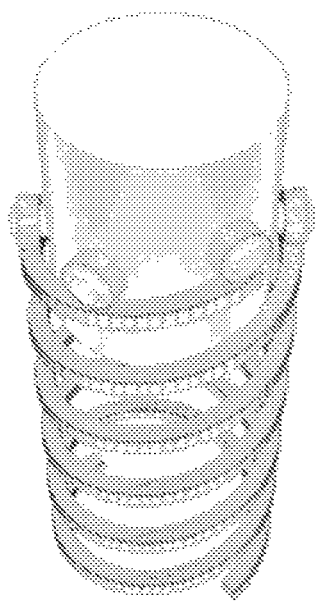
FIG. 9 is a perspective view of a spiral track based system design. A module is shown with various module drivers.
Figure 10:
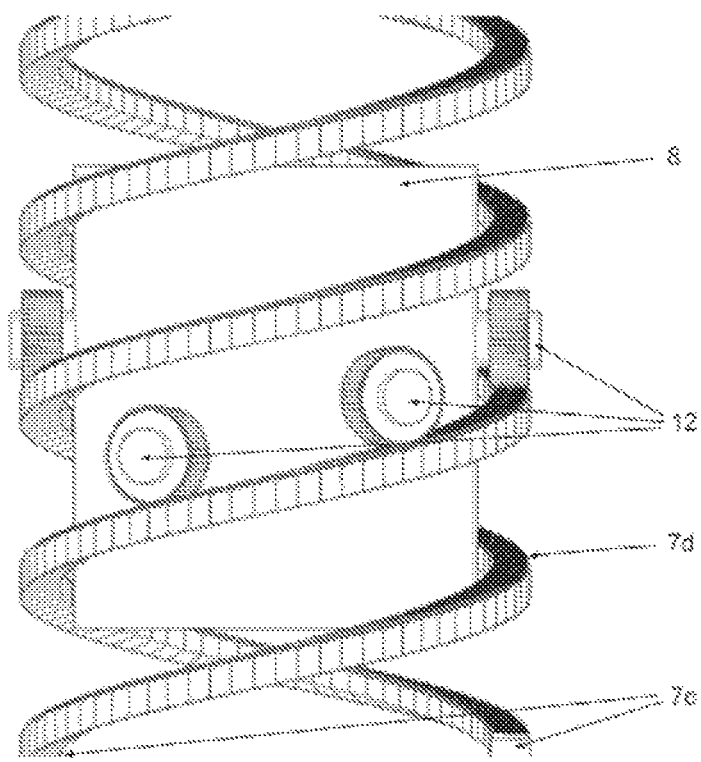
FIG. 10 is an elevation view of a spiral track based system design. A module is shown with various module drivers.

FIGS. 8-10 illustrate an embodiment of the invention wherein at least some portion of said substantially vertical pathway is comprised of one or more tracks which are in the shape of a spiral. This spiral may be fixed to a shaft wall so that it forms a load-bearing ramp at the edges of the shaft. If it is advantageous, multiple instances of said spiral track may be utilized, where each instance can be offset in rotation to form various helical shapes such as a double helix, triple helix, etc. as illustrated. FIGS. 8-10 further show module driver assemblies with geared wheels which are located on the outside of the module and positioned in such a manner that they can interact with the ramp surface of said spiral tracks for the purpose of driving the module. As illustrated, these module driver assemblies may be offset to the correct height and rotational angle to properly engage with the spiral track while supporting the weight of the heavy module and keeping the module level.

Figures 11, 12:
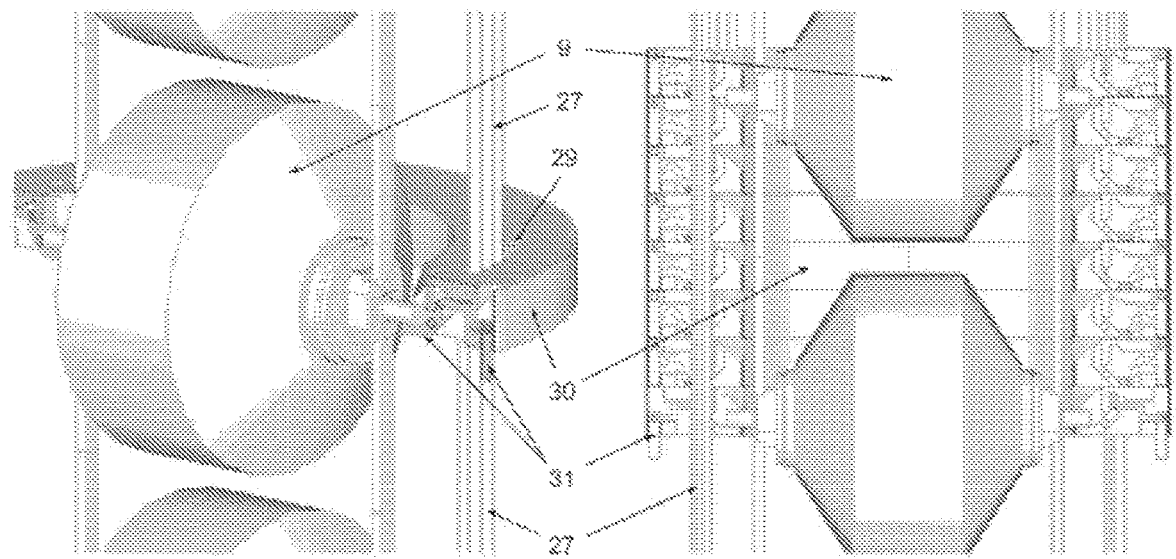
FIG. 11 is an axonometric, partial section view of a cable-based system design. The illustration shows multiple cables passing through various cable guiding channels, and it shows a load-bearing bracket with latching mechanisms with a lever and pin device.
FIG. 12 is an elevation view of a cable-based system design. The illustration shows a stack of load-bearing brackets—each with latching mechanisms with a lever and pin device. Only the bottom-most load-bearing bracket has an extended lever. The other load-bearing brackets have lifted levers.

FIGS. 11-13 illustrate another embodiment wherein the energy storage system comprises a modular design which allows for a scalable number of many cables or tethers to support sections of weight so as to avoid supporting all of the weight with one tethered connection. Motor/generator units located at ground level extend said cables through various cable guiding channels which guide each cable to attach to a module load-bearing bracket. FIG. 11 further shows that said load-bearing bracket may contain one or more load-bearing bracket latching mechanisms. FIG. 12. Further shows that said load-bearing brackets may be stacked. As illustrated in FIGS. 11-12, the latching mechanism can be designed in such a way to allow for the bottom-most module to always fall through the top load-bearing brackets (whose latching mechanisms are lifted) until it hits the bottom-most load-bearing bracket whose latching mechanism is extended. This latching mechanism works with a lever and a pin whereby the lever falls into the extended position unless a load-bearing bracket below it presses up onto its pin which lifts the lever. In this way, as the load-bearing brackets above are pulled up flush against one another, their latching mechanisms will be lifted, providing an open channel for weights to fall through until they hit the bottom load-bearing bracket. This design allows for each module to be assigned its own load-bearing bracket, which in turn designates to each module its own pair of load-bearing cables, thus distributing the modules' combined gravitational load amongst the system of many cables or tethers.

FIG. 14 illustrates another embodiment wherein a module supporting crane assembly is located at ground level over a substantially vertical pathway in the form of a shaft. The crane assembly includes motor/generators which can lift and drop the modules vertically along the axis of the gravitational force. The crane assembly also includes arm mechanisms which are typical of a crane which can move the modules in lateral directions thus enabling the system to stack and unstack said modules in some convenient formation such as in stacked rings around said shaft, and also enabling the system to raise and lower said modules into and out of the vertical shaft.

FIG. 15 illustrates another embodiment wherein a module supporting conveyor belt is positioned vertically along a substantially vertical pathway in the form of a shaft. The conveyor belt is driven by motor/generators which are located along the vertical portion of the pathway and may be installed into cavities excavated into bedrock. The module supporting conveyor belt enables the system to raise and lower said modules inside of the shaft.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A system for gravity-powered storage, the system comprising:
   a substantially vertical shaft, the substantially vertical shaft disposed underground, the substantially vertical shaft spanning a height;
   a plurality of modules disposed within the shaft, each of the modules comprising a weight;
   at least one module driver assembly affixed within the substantially vertical shaft, the module driver assembly comprises an electric motor/generator; and
   a conveyor component disposed within the shaft, the conveyor component coupled to the module driver assembly, the conveyor component affixed to at least one module, the conveyor component configured to move the module within the shaft via the module driver assembly.

2. The system of claim 1, wherein the at least one module is coupled to at least one adjacent module.

3. The system of claim 1, wherein the system comprises a plurality of module driver assemblies.

4. The system of claim 1, wherein the conveyor component is affixed to a subsurface geological feature.

5. The system of claim 1, wherein the system further comprises a power conversion component configured to transmit electrical energy between the at least one module driver assembly and a power grid.

6. The system of claim 1, wherein the conveyor component comprises a belt.

7. The system of claim 6, wherein the belt comprises a plurality of teeth, the plurality of teeth configured to mesh with the at least one module driver assembly.

8. The system of claim 1, wherein the at least one module driver assembly comprises at least a pair of module driver assemblies disposed laterally relative to the substantially vertical shaft.

9. The system of claim 8, wherein the at least a pair of module driver assemblies comprises a plurality of pairs of modular driver assemblies disposed along the substantially vertical shaft.

10. The system of claim 1, further comprising a substantially horizontal shaft in communication with the substantially vertical shaft.

11. A system for gravity-powered storage, the system comprising:
- a substantially vertical shaft, the substantially vertical shaft disposed underground, the substantially vertical shaft spanning a height;
- a plurality of modules disposed within the shaft, each module having a first end and a second end, defining a length therebetween, the plurality of modules each having a weight;
- a plurality of module driver assemblies affixed within the substantially vertical shaft and laterally spaced along a length of the substantially vertical shaft, each module driver assembly having a pair of electric motor/generators; and
- a conveyor component disposed within the shaft, the conveyor component coupled to the plurality of module driver assemblies and the plurality of modules,
    - wherein the conveyor component is configured to move with the plurality of modules along the height of the substantially vertical shaft, thereby rotating the plurality of module driver assemblies.

12. The system of claim 11, wherein the system further comprises a power conversion component configured to transmit electrical energy between the plurality of module driver assemblies and a power grid.

13. The system of claim 11, wherein the conveyor component comprises a belt having a plurality of teeth, the plurality of teeth configured to mesh with the plurality of module driver assemblies.

14. The system of claim 11, wherein the plurality of module driver assemblies are configured to rotate and locomote the plurality of modules along the substantially vertical shaft via the conveyor component.

15. The system of claim 11, wherein at least a portion of the plurality of modules are configured to absorb, store and release thermal energy.

16. The system of claim 11, wherein at least a portion of the plurality of modules comprises at least one secondary energy storage system selected from the group of: a rotational energy storage system comprising at least one flywheel, a chemical battery storage system, and a thermal energy storage system.

17. A system for gravity-powered storage, the system comprising:
- at least one substantially vertical shaft, the at least one substantially vertical shaft disposed underground, the at least one substantially vertical shaft spanning a height;
- a plurality of modules disposed within the at least one substantially vertical shaft;
- a crane system disposed above ground, the crane system having a plurality of retractable tethers, each of the plurality of retractable tethers configured to releasably couple to at least one module,
    - wherein each of the plurality of retractable tethers are configured to move at least one module along the height of the substantially vertical shaft, and wherein the crane system is configured to move at least one module laterally within the substantially vertical shaft.

18. The system of claim 17, wherein the plurality of retractable tethers are slidingly coupled to at least one beam, the plurality of retractable tethers configured to translate along the at least one beam.

19. The system of claim 17, wherein each of the plurality of retractable tethers are coupled to at least one motor/generator configured to extend and/or retract the retractable tether.

20. The system of claim 19, wherein the at least one motor/generator is disposed on the at least one beam.

* * * * *